United States Patent
Thuerk

(10) Patent No.: US 8,028,236 B2
(45) Date of Patent: Sep. 27, 2011

(54) SYSTEM SERVICES ENHANCEMENT FOR DISPLAYING CUSTOMIZED VIEWS

(75) Inventor: Keith A. Thuerk, Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 1320 days.

(21) Appl. No.: 10/688,406

(22) Filed: Oct. 17, 2003

(65) Prior Publication Data

US 2005/0086280 A1  Apr. 21, 2005

(51) Int. Cl.
*G06F 3/00* (2006.01)
*G06F 9/46* (2006.01)
*G06F 15/173* (2006.01)
*G06F 7/00* (2006.01)

(52) U.S. Cl. ........ 715/741; 715/743; 715/744; 715/745; 718/100; 709/223; 707/738; 707/784

(58) Field of Classification Search .................. 715/741, 715/742, 743, 745, 744; 718/100; 709/223, 709/224, 225, 226; 726/6; 707/736, 738, 707/784, 783
See application file for complete search history.

(56) References Cited

U.S. PATENT DOCUMENTS

| | | | |
|---|---|---|---|
| 5,339,427 A * | 8/1994 | Elko et al. ........... | 718/103 |
| 5,384,910 A | 1/1995 | Torres | |
| 5,475,845 A * | 12/1995 | Orton et al. ........... | 719/328 |
| 5,550,968 A * | 8/1996 | Miller et al. ........... | 715/741 |
| 5,644,738 A | 7/1997 | Goldman et al. | |
| 5,760,768 A | 6/1998 | Gram | |
| 5,938,732 A * | 8/1999 | Lim et al. ........... | 709/229 |
| 6,038,597 A * | 3/2000 | Van Wyngarden ........... | 709/219 |
| 6,069,623 A | 5/2000 | Brooks | |
| 6,133,915 A | 10/2000 | Arcuri et al. | |
| 6,263,346 B1 | 7/2001 | Rodriguez | |
| 6,286,047 B1 * | 9/2001 | Ramanathan et al. ........ | 709/224 |
| 6,505,245 B1 * | 1/2003 | North et al. ........... | 709/223 |
| 6,513,111 B2 * | 1/2003 | Klimczak et al. ........... | 713/1 |
| 6,785,728 B1 * | 8/2004 | Schneider et al. ........... | 709/229 |
| 6,954,220 B1 * | 10/2005 | Bowman-Amuah ........... | 715/741 |
| 7,020,645 B2 * | 3/2006 | Bisbee et al. ........... | 707/1 |
| 7,020,696 B1 * | 3/2006 | Perry et al. ........... | 709/223 |

(Continued)

FOREIGN PATENT DOCUMENTS

WO  WO 00/34859  6/2000

OTHER PUBLICATIONS

Microsoft Computer Dictionary, 2002, Microsoft Press, Fifth Edition, pp. 16 and 573.*

(Continued)

*Primary Examiner* — Tadeese Hailu
*Assistant Examiner* — Nicholas S Ulrich
(74) *Attorney, Agent, or Firm* — Novak Druce + Quigg LLP

(57) ABSTRACT

A method for presenting system services can include the step of establishing a multitude of system service profiles. A request for the presentation of system services can be detected. One of the system service profiles associated with the request can be determined. For example, the system service profile can be determined based at least in part upon user identity. The system service profile can also be determined based at least in part upon server identity. At least one system service can be listed in accordance with the determined system service profile.

8 Claims, 3 Drawing Sheets

U.S. PATENT DOCUMENTS

| | | | |
|---|---|---|---|
| 7,089,501 B1 * | 8/2006 | Lilienthal et al. | 715/764 |
| 7,159,179 B2 * | 1/2007 | Taniguchi et al. | 715/741 |
| 7,197,712 B2 * | 3/2007 | Muehlhausen | 715/743 |
| 7,222,369 B2 * | 5/2007 | Vering et al. | 726/28 |
| 2002/0013827 A1 * | 1/2002 | Edstrom et al. | 709/219 |
| 2002/0024539 A1 | 2/2002 | Eleftheriadis et al. | |
| 2003/0058277 A1 * | 3/2003 | Bowman-Amuah | 345/765 |
| 2003/0061482 A1 * | 3/2003 | Emmerichs | 713/165 |
| 2004/0041840 A1 * | 3/2004 | Green et al. | 345/776 |
| 2004/0046785 A1 * | 3/2004 | Keller | 345/734 |
| 2004/0205117 A1 * | 10/2004 | Hertling et al. | 709/203 |
| 2005/0065935 A1 * | 3/2005 | Chebolu et al. | 707/9 |
| 2005/0076205 A1 * | 4/2005 | Thornton et al. | 713/156 |

OTHER PUBLICATIONS

Clark, J. R., et al., "Customizing the LAN NetView Fix Action Table", IBM Tech. Dis. Bull. vol. 37, No. 4B, pp. 115-116, (Apr. 1994).

Yew, A., et al., "Customisable Off-line Web Browsing with Mobile Software Agents", IEEE, pp. 102-108, (2000).

* cited by examiner

FIG. 3

| Category | Service Name | Server | Status |
|---|---|---|---|
| Print Operator | Fax Service 1 | Fax 1 | Disabled |
| | Print Service 1 | PServer 1 | Operational |
| | Print Service 2 | Printer 1 | Operational |
| Email Operator | Email Service 1 | MServer 1 | Operational |
| | Email Service 2 | MClient 1 | Operational |
| | Email Service 3 | MClient 2 | Disabled |

Left pane: + Services (Local); − Services (Remote): Server 1, Server 2, Server 3

FIG. 4

| Category | Service Name | Status |
|---|---|---|
| Administrator | Service 1 | Operational |
| | Service 2 | Operational |
| | Service 3 | Disabled |
| | Service 4 | Operational |
| | Service 5 | Operational |
| | Service 6 | Disabled |

Tabs: Server 425 | Server 430 | Client 435 | Peripheral 440

Left pane: − Services (Remote): Printer, Email, Storage, Misc

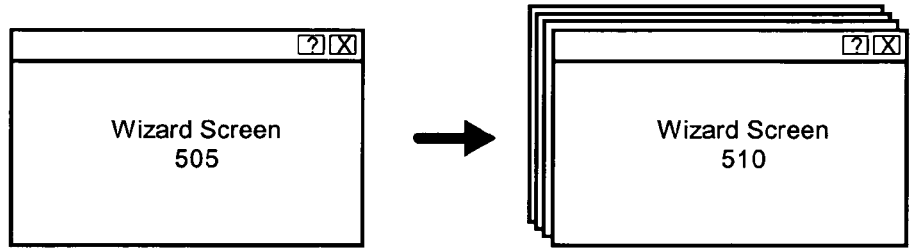

FIG. 5

Wizard Screen 505 → Wizard Screen 510

SYSTEM SERVICES ENHANCEMENT FOR DISPLAYING CUSTOMIZED VIEWS

BACKGROUND

1. Field of the Invention

The present invention relates to the field of computer software and, more particularly, to an enhancement to system services interfaces.

2. Description of the Related Art

Microsoft system services are programs that constantly run in the background of an operating system that perform necessary actions for the operating system. For example, the Microsoft Windows XP™ Operating System includes a Clipboard Service, a Server Service, a Windows Time Service, and many others. System administrators often view and/or modify system services to troubleshoot computer, peripheral, and network problems. The viewing and modification of system services is generally performed using the appropriate administrative tools developed for the operating system upon which the services are run. For the Microsoft Windows XP™ Operating System, the administrative tools include the Microsoft Configuration Utility™ that manages system services.

The administrative tools for system services typically display all system services in an alphabetical fashion. The display can include a number of system services that are disabled or set to a manual state. Since different servers within a business network can have different purposes, only a subset of system services may be important. Nevertheless, conventional system service GUIs present all available system services, including a large quantity of relatively unimportant services.

Further, large computer networks can be managed by a number of system administrators, each in charge of a different portion of the network. Each network administrator typically is concerned with different views of the system services that can affect portions of the network with which that administrator is responsible. At present, because conventional tools display all services regardless of whether the administrator has rights to the service, system administrators must scroll through a large number of services to locate a small set of services to which the administrator has rights and/or authority. The presentation of all available system services within conventional management tools can therefore be inefficient and can be cumbersome to administrators. Further, the presentation of extraneous system services can represent a potential system security weakness; one permitting low-level administrators to seize control of system services outside of intended privilege boundaries.

SUMMARY OF THE INVENTION

The present invention provides a method, a system, and an apparatus for customizing the display of system services within an administrative interface. More specifically, a number of system service profiles can be established for various users, groups, and servers. Each of the system service profiles can specify the most relevant system services for the associated user, group, and/or server. The system service profiles, which specify a set of applicable system services, can be accessed whenever a system service interface is initiated. The specified subset of system services, as opposed to a complete set of system services, can be displayed within the system service interface.

One aspect of the present invention can include a method for presenting system services. The system services can be Microsoft™ system services that execute within a Microsoft™ type operating system. The method can include the step of establishing a multitude of system service profiles. A request for the presentation of system services can be detected. A user identity associated with the request can be ascertained so that one of the system service profiles associated with the request can be determined. A graphical user interface specific to the determined system service profile that includes at least one system service can be presented. The graphical user interface can include a view contained within the Microsoft Configuration Utility™ or a utility compatible with the Microsoft Configuration Utility™.

In one embodiment, the system service profiles can be integrated with the directory services of an operating system handling the system services. In another embodiment, a privilege group can be associated with the ascertained user identity. The system service profile can be based upon the privilege group. Alternatively, the system service profile used to limit the displayed system services can be unique to the user that initiated the request.

In a particular embodiment, the system services specified within the service profiles can be categorized into a plurality of categories. In another embodiment, the system services can be categorized according to at least one of the servers that provide the services. At least a portion of the system services can be displayed within the graphical user interface according to the categories.

In yet another embodiment, a system service configuration can be provided so that authorized users can modify at least one system service profile. Additionally, a series of views can be provided to configure at least one system service profile. The series of views can be presented in a step-wise fashion and can represent a system service profile configuration wizard.

Another aspect of the present invention can include a system for administrating operating system services. The system can include a services view, a means for limiting the services displayed in the services view, a means for ordering the display of services, and/or a profile management interface. The services view can graphically display a multitude of operating system services. The limiting means can limit displayed services to a subset of currently executing services. In one embodiment, the limiting means can be a software plug-in for a Microsoft Windows™ type operating system. Additionally, the operating system services can be Microsoft Windows™ type services and the limiting means can be disposed within a directory services computing space. For example, the directory services computing space can include a Microsoft Active Directory™ compatible space or a Novell Directory Services™ compatible space. The profile management interface can permit an authorized user to customize the limiting means. Further, the ordering means can order the display of the services within the services view according to various predefined categories of services.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 is an exemplary GUI for managing system services in accordance with the inventive arrangements disclosed herein.

FIG. 4 is another exemplary GUI for managing system services in accordance with the inventive arrangements disclosed herein.

FIG. 5 is a schematic diagram illustrating a profile configuration wizard in accordance with the inventive arrangements disclosed herein.

DETAILED DESCRIPTION OF THE INVENTION

Figure 1:
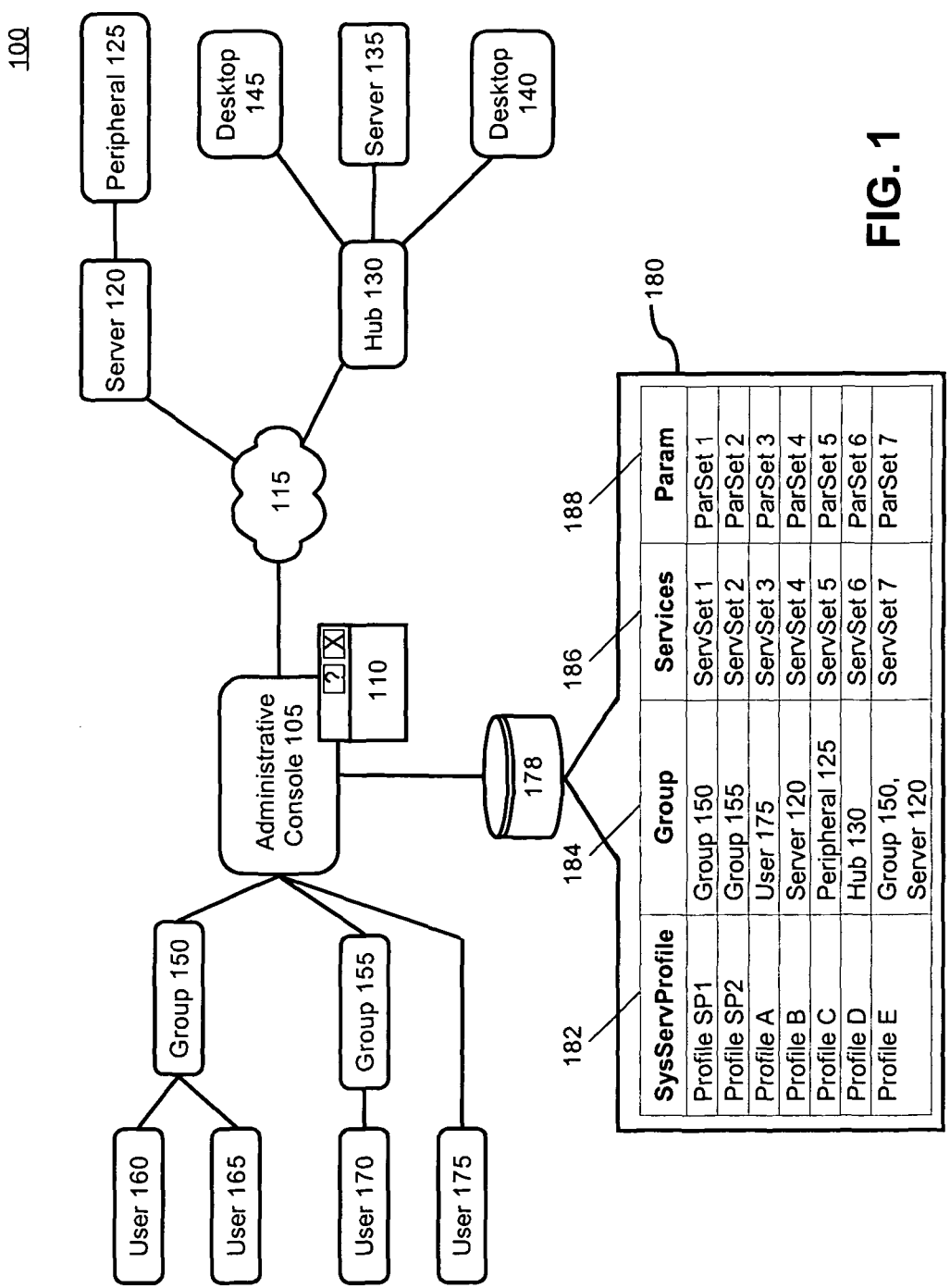
FIG. 1 is a schematic diagram illustrating a system for managing system services in accordance with the inventive arrangements disclosed herein.

FIG. 1 is a schematic diagram illustrating a system 100 for managing system services in accordance with the inventive arrangements disclosed herein. System services can include a multitude of operating system programs that can execute in the background of an operating system to handle operating system events, such as the installation/removal of plug and play devices, error logging and reporting, dial-up activities, and the like. For example, the Microsoft Windows XP™ Operating System includes a Plug and Play Service, an Error Reporting Service, a Telephony Service, and numerous other services.

In system 100, an administrative console 105 can be used to manage system services. For example, in one embodiment where the operating system of system 100 is a Microsoft Windows™ type operating system, the administrative console 105 can include the Microsoft Configuration Utility™ for managing services. A Microsoft Windows™ type operating system can include Windows 95™, Windows 98™, Windows NT™, Windows 2000™, Windows XP™, Windows 2003™, and other operating systems past and future that are forward and/or backward compatible with the listed operating systems. In another example, the administrative console 105 can manage services for the Linux™ operating system, the Apple™ operating system, the z/OS™, as well as any other computer operating system that utilizes system services.

The administrative console 105 can display system services provided by one or more computing devices including server 120, peripheral 125, hub 130, server 135, desktop 140, and/or desktop 145. Moreover, settings of the administrative console 105 can be used to limit the services presented in a computing device specific manner. For example, when the server 120 is a print server, the system services associated with server 120 can be limited to those services relating to printing and print management. In another embodiment, the services presented to an email administrator for server 130, which can be an e-mail server, can be limited to e-mail related services. Alternatively, a less restricted view of services for the server 130 can be presented to a server administrator.

Further, the administrative console 105 can be accessed by a number of different users and groups including user 160, user 165, user 170, user 175, group 150, and group 155. Group 150 and 155 can include a set of users having a set of privilege levels for the services managed by the administrative console 105. Privilege levels can include, but are not limited to, permissions for guests, default users, power users, system back-up administrators, printer administrators, application administrators, help-desk technicians, developers, and the like. Different system services can be presented to different users and privilege groups. For example, guests and default users can be provided with no access to system services; power users can be provided with limited, machine-specific access to system services; and, system administrators can be provided full access to system services.

The administrative console 105 can limit the presentation of system services by establishing system service profiles. A system service profile can be a memory space for specifying a system service subset. System service profiles can be established for users, groups, computing devices, and/or a combination of the same.

Additionally, the administrative console 105 can include a graphical user interface (GUI) 110 and a profile data store 178. The GUI 110 can include a service management view within which service management options can be presented. For example, using the GUI 110, authorized users can view, initiate, terminate, modify, and/or otherwise manipulate system services. In one embodiment, the GUI 110 can include a profile management interface, which can permit authorized users to modify system service profiles.

The profile data store 178 can be a storage space used to store and retrieve system service profiles that the administrative console 105 utilizes. Table 180 represents data contained by the profile data store 178. It should be appreciated, however, that table 180 is included for purposes of illustration only, and that any suitable data schema can be used to specify system service profile information.

The table 180 can include column fields for a system service profile 182, a group 184, a service set 186, and a parameter set 188. The system service profile 182 can be a key field that uniquely identifies a particular profile. The group 184 can specify the set of individuals and/or computing devices to which a profile applies. For example, when the group 184 specifies group 150, the corresponding profile (Profile SP1) can apply to user 160, user 165, and any and other members of group 150. In another example, the group 184 can specify that Profile B can apply to services provided by server 120.

The service set 186 can establish which system services are affected by the system service profile 182. In one embodiment, the service set 186 can represent the services that are to be displayed when the corresponding profile is utilized. In another embodiment, the service set 186 can represent services that are to be hidden or not displayed when the corresponding profile is utilized. The parameter set 188 can include a variety of settings that can be specified for a system service profile 182. For example, the parameter set 188 can include parameters for ordering displayed system services, profile specific interface 110 options, and the like.

It should be noted that multiple system service profiles 182 can apply to users of the administrative console 105. For example, Profile SP2 and Profile D can both apply when user 170 is presented system service information concerning hub 130. The handling of multiple profiles by the administrative console 105 can depend upon settings established within the administrative console 105. For example, one setting (a union setting) can result in the display of those services satisfying all applicable system service profile conditions. In another example, a different setting within the administrative console 105 can result in the display of those services satisfying other ones of the applicable system service profile conditions.

Additionally, in one embodiment, the functionality of the administrative console 105 can be accessed remotely from a communicatively linked computing device, which can be include server 120, server 135, desktop 145, and/or desktop 140. The accessing computing device can function as a dumb terminal, as a second administrative console, and/or as a profile configuration server. In another embodiment, data within the profile data store 178 can be centrally located. In such an embodiment, multiple administrative consoles can access profile information contained within the profile data store 178.

Figure 2:
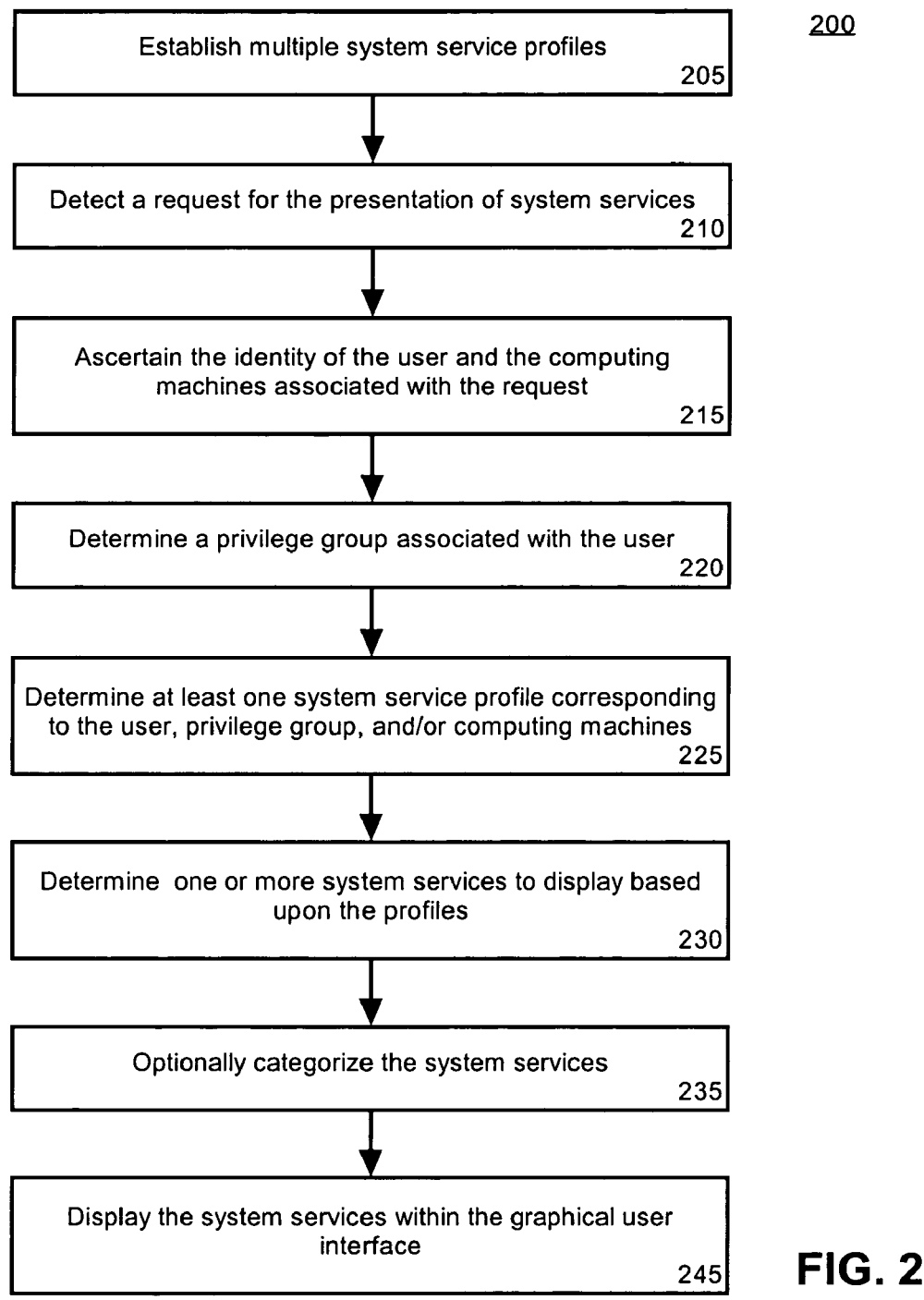
FIG. 2 is a flow chart illustrating a method for presenting system services within a graphical user interface (GUI) in accordance with the inventive arrangements disclosed herein.

FIG. 2 is a flow chart illustrating a method 200 for presenting system services within a GUI in accordance with the inventive arrangements disclosed herein. The method 200 can begin in step 205, where multiple system service profiles can be established. Each system service profile can represent a customized subset of system services. The customization can be associated with a user, group, and/or computing system. In step 210, a request for the presentation of system services can be detected. For example, a user of an administrative console can initialize a GUI for managing system services or sign in so that the GUI can be activated. In step 215, the identity of the user that initialized the request can be determined. For example, the user identification for the user logged onto the machine that made the detected request can be determined. A computing device or set of computing devices associated with the request can also be identified in step 215.

In step 220, a privilege group can be optionally identified. For example, the user making the request can be identified as a power user, a printer administrator, and/or a system administrator. In step 225, at least one system service profile can be determined from the user identifier, privilege group, and/or computing system. In step 230, one or more system services can be selected for display based upon the system service profiles. In one embodiment, these system services can be accessed by a requestor based upon access rights specified within the system service profile. In step 235, the system services can be optionally categorized. For example, the system services can be categorized by functional group and/or computing device. In step 245, the system services that are to be displayed can be presented within the GUI. If the system services were previously categorized, the system services can be ordered or otherwise arranged by category.

FIG. 3 is an exemplary GUI 300 for managing system services according to one embodiment of the invention disclosed herein. The GUI 300 can include a navigation section 305 and a detail section 307. The navigation section 305 can display service categories and subcategories. Selections made within the navigation selection 305 can have a dynamic affect upon the data displayed within the detailed section 307.

The detail section 307 can include, but is not limited to, a category column 310 for displaying service categories, a service name column 315 for displaying the service names, a server column 320 for displaying the server that provides an associated service, a status column 325 for displaying operational status of an associated service, and the like.

In operation, the Services (local) item can be selected from within the navigation section 305. In response to the selection, all services local to the computing system meeting the criteria established by the appropriate system service profile can be displayed within the detailed section 307. For example, two service profiles, one for a Print Operator and one for an E-mail Operator, can be determined to be applicable for in a given instance shown in GUI 300. In the example, the user requesting services can have two functional roles, that of Print Operator and Email Operator. If the user requesting services only had one functional role, then only the category for that functional role would be displayed. It should be noted that the detail section 307 can order services first according to profile and second in descending alphabetical order according to service name.

FIG. 4 is another exemplary GUI 400 for managing system services according to one embodiment of the invention disclosed herein. The GUI 400 can include a navigation section 405 and a detail section 407 that operate in a fashion similar to the equivalent components detailed in FIG. 3. The navigation selection 405, however, can include category navigation items based upon functional categories, such as printer, e-mail, storage, and the like. The detail section 407 can include several display tabs, each for a different computer device. When a computer device tab is selected, the system services of the associated computing device can be presented. Computing devices on the tabs can include, for example, server 425, server 430, client 435, and peripheral device 440.

In one embodiment, the only services and options available to a user of GUI 400 will be those to which the user has been authorized. The GUI 400 can then be dynamically modified based on the user's privileges and/or associated system service profile. For example, when a system user does not have permission for server 425 and/or server 430, tabs for those servers will not appear within the detail section 407. In another example, if the user of GUI 400 is a power user, as opposed to an administrator, the detail section 407 will contain those services to which the power user has been granted privileges.

FIG. 5 is a schematic diagram illustrating a profile configuration wizard 500 in accordance with the inventive arrangements disclosed herein. The profile configuration wizard 500 can include a series of views that perform a task relating to at least one system service profile. The series of views can include wizard screen 505 and at least one other wizard screen 510. Each of the views of the profile configuration wizard 500 can be displayed in a step-wise fashion to prompt a user for information relating to system services profile management and operation. Accordingly, the profile configuration wizard 500 can allow an authorized user to setup a profile, define profile categories, specify services for each profile, and the like.

The various GUIs disclosed herein are shown for purposes of illustration only. Accordingly, the present invention is not limited by the particular GUI or data entry mechanisms contained within views of the GUI. Rather, those skilled in the art will recognize that any of a variety of different GUI types and arrangements of data entry, fields, selectors, and controls can be used.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for customizing a display of system services within an administrative interface comprising the steps of:
   categorizing system services into functional categories based on functions of the system services, wherein the system services are software programs that constantly run in the background of an operating system that perform actions for the operating system;
   establishing a plurality of system service profiles based on functional roles of users, each system service profile representing a customized subset of the system services;
   detecting a request for the presentation of system services from a user;
   ascertaining an identity of the user and at least one functional role associated with the user;
   determining at least one of said system service profiles corresponding to the at least one functional role of the user;
   determining at least one system service to be displayed in accordance with the at least one determined system service profile; and
   displaying the determined at least one system service within the administrative interface in a manner that the determined at least one system service is navigable based on the functional categories of the determined at least one system service, the at least one determined system service profile corresponding to the user, and computing devices providing the determined at least one system service.

2. The method of claim 1, further comprising the step of:
   categorizing said system services by computing device.

3. The method of claim 2, said categorizing step further comprising the step of:
   categorizing the system services according to servers that provide said system services.

4. The method of claim 1, said establishing step further comprising the step of:
   providing a system services configuration interface so that authorized users can modify at least one system service profile.

5. The method of claim 4, said providing step further comprising the steps of:
   providing a series of views to perform a task relating to at least one system service profile in a step-wise fashion, whereby said series of views represent a system service profile configuration wizard.

6. The method of claim 1, wherein said system services profiles are integrated with the directory services of an operating system handling said system services.

7. A machine-readable storage having stored thereon, a computer program having a plurality of code sections, said code sections executable by a machine for causing the machine to perform the steps of:
   categorizing system services into functional categories based on functions of the system services, wherein the system services are software programs that constantly run in the background of an operating system that perform actions for the operating system;
   establishing a plurality of system service profiles based on functional roles of users, each system service profile representing a customized subset of the system services;
   detecting a request for the presentation of system services from a user;
   ascertaining an identity of the user and at least one functional role associated with the user;
   determining at least one of said system service profiles corresponding to the at least one functional role of the user;
   determining at least one system service to be displayed in accordance with the at least one determined system service profile; and
   displaying the determined at least one system service within an administrative interface in a manner that the determined at least one system service is navigable based on the functional categories of the determined at least one system service, the at least one determined system service profile corresponding to the user, and computing devices providing the determined at least one system service.

8. A computer-implemented system for customizing a display of system services within an administrative interface comprising:
   means for categorizing system services into functional categories based on functions of the system services, wherein the system services are software programs that constantly run in the background of an operating system that perform actions for the operating system;
   means for establishing a plurality of system service profiles based on functional roles of users, each system service profile representing a customized subset of the system services;
   means for detecting a request for the presentation of system services from a user;
   means for ascertaining an identity of the user and at least one functional role associated with the user;
   means for determining at least one of said system service profiles corresponding to the at least one functional role of the user;
   means for determining at least one system service to be displayed in accordance with the at least one determined system service profile; and
   means for displaying the determined at least one system service within the administrative interface in a manner that the determined at least one system service is navigable based on the functional categories of the determined at least one system service, the at least one determined system service profile corresponding to the user, and computing devices providing the determined at least one system service.

* * * * *